United States Patent [19]
Wu et al.

[11] Patent Number: 6,055,585
[45] Date of Patent: Apr. 25, 2000

[54] SYSTEM FOR OPERATING A UNIVERSAL ASYNCHRONOUS RECEIVER/ TRANSMITTER (UART) AT SPEEDS HIGHER THAN 115,200 BPS WHILE MAINTAINING FULL SOFTWARE AND HARDWARE BACKWARD COMPATIBILITY

[75] Inventors: Xing W. Wu, Elk Grove Village; Ming D. Tan, Gurnee, both of Ill.

[73] Assignee: 3Com Corporation, Santa Clara, Calif.

[21] Appl. No.: 09/087,627

[22] Filed: May 29, 1998

[51] Int. Cl.$^7$ ....................................... G06F 13/14
[52] U.S. Cl. ........................... 710/29; 710/105; 710/100; 375/377; 375/354
[58] Field of Search ............................. 710/29, 100, 105, 710/106; 375/377, 354

[56] References Cited

U.S. PATENT DOCUMENTS

| | | | |
|---|---|---|---|
| 4,700,358 | 10/1987 | Duncanson et al. | 375/222 |
| 5,241,647 | 8/1993 | Lin et al. | 713/501 |
| 5,357,092 | 10/1994 | Lee | 235/462 |
| 5,604,870 | 2/1997 | Moss et al. | 710/100 |
| 5,649,122 | 7/1997 | Wegner et al. | 710/105 |
| 5,712,881 | 1/1998 | Iijima | 375/354 |
| 5,742,502 | 4/1998 | King | 710/61 |
| 5,754,764 | 5/1998 | Davis et al. | 709/250 |
| 6,002,733 | 12/1999 | Kim | 375/377 |

OTHER PUBLICATIONS

Exar, ST16C650A, UART With 32–Byte Fifo's And Infrared (IrDA) Encoder/Decoder. pp. 1–31.

*Primary Examiner*—Thomas C. Lee
*Assistant Examiner*—Abdelmoniem Elamin
*Attorney, Agent, or Firm*—McDonnell Boehnen Hulbert & Berghoff

[57] ABSTRACT

A method and apparatus for increasing the speed of a Universal Asynchronous Receiver/Transmitter ("UART") while maintaining backward compatibility. The UART contains registers for controlling the flow of data. Two registers are the DLL (Divisor Latch Least significant) internal register and the DLM (Divisor Latch Most significant) internal register. Due to the UART not using all of the 16 bits contained in the DLL and DLM registers, an additional register, the Increased Baudrate (IB) register, is created. The IB register uses bits which are unused (or always set to zero in a conventional UART). Through the IB register, the UART may use higher crystal frequencies. In addition, when the UART is at speeds equal to or less than 115,200 bits per second, the IB register is programmed to zero, thus mimicking the operation of a convention UART at speeds equal to or less than 115,200 bits per second. Thus, the method and system for a high speed UART increases speeds while still maintaining backward compatibility.

21 Claims, 5 Drawing Sheets

SYSTEM FOR OPERATING A UNIVERSAL ASYNCHRONOUS RECEIVER/ TRANSMITTER (UART) AT SPEEDS HIGHER THAN 115,200 BPS WHILE MAINTAINING FULL SOFTWARE AND HARDWARE BACKWARD COMPATIBILITY

NOTICE REGARDING COPYRIGHT

A portion of the disclosure of this patent document contains matter subject to copyright protection. The copyright owner has no objection to the facsimile reproduction by anyone of the patent disclosure document as it appears in the Patent and Trademark Office files and records, but otherwise retains all copyrights whatsoever.

BACKGROUND OF THE INVENTION

The present invention relates to a universal asynchronous receiver/transmitter (UART) and, more particularly, to a UART which supports baudrates higher than 115,200 bps (bits per second) and maintains software and hardware backward compatibility.

Computers such as PCs (personal computers) have serial ports, which are used for bringing data into and out of the computer. The serial port is used for data movement on a channel which requires that one bit be sent (or received) after another, i.e. serially. The UART is typically a device that performs the parallel-to-serial conversion of digital data to be transmitted and the serial-to-parallel conversion of digital data that has been received. The UART converts the incoming serial data from devices such as a modem (or whatever else is connected to the serial port) into the parallel form which the computer handles. The UART also performs the opposite operation by converting the computer's parallel data into serial data suitable for asynchronous transmission.

Prior hardware implementations of the UART include the National Semiconductor 8250 UART which was incorporated with the IBM Personal Computer. The 8250 was limited to 9600 baud maximum rate and was later replaced with the 16450, which has the same architecture as the 8250 but has a higher maximum baud specification. Both of the chips have only a one byte buffer. Therefore, the one byte buffer must be serviced immediately by the CPU; otherwise, interrupt overruns will result. Further, the one byte buffer may slow down the transmission of high-speed data, particularly when using a multitasking program. The 16450 was thereafter replaced by the 16550, which has two 16 byte buffers, one buffer each for incoming and outgoing data, thereby allowing a longer interrupt response time. If interrupt response time is not considered, both 16450 & 16550 UARTs can support baudrates of up to 115,200 bps.

In addition, modems used in conjunction with a UART may be utilized to download data at a rate of up to 56,000 bits/second in accordance with ITU-T Recommendation V.90, the contents of which are incorporated herein. These modems that employ data compression may require an input data rate above 115,200 bps.

Efforts were made to break the baudrate bottleneck of 115,200 bps. However, prior solutions failed to solve both the hardware and software compatibility problems. For instance, one might attempt to simply increase the external clock used for the timing of the UART. Conventional external clocks used for timing of UARTs are 1.8432 MHz. The clock output is generated by using a crystal frequency rated for 1.8432 MHz in combination with a clock generator. Increasing the frequency of the crystal can increase the speed of the UART. However, there are both hardware and software problems associated with simply replacing the crystals. First, there is a hardware problem in terms of physically replacing the existing external clock. In upgrading a conventional UART, the previous external clock must be physically replaced within the circuit board within the computer with the higher speed external clock. This switching of external clocks may prove difficult. Second, there is a software incompatibility problem associated with the increased speed of the external clocks. The current UART software is not designed to handle such upgrades.

As another example of an attempt to increase the speed of the UART, StarTech's ST16650 uses MCR.b7 ( Modem Control Register Bit 7) as a clock switch to control the generation of two different clock frequencies to the Baudrate Divisor circuit. There are two major drawbacks of this approach. First, it is not compatible with current Serial Communication software. Second, the limitation of the Modem Control Register Bit 7 leaves no room for future speed expansion.

Accordingly it is desirable to have an improved UART which supports baudrates higher than 115,200 bps, and maintains full software and hardware backward compatibility, so current software will still work at baudrates up to 115,200 bps, and leave enough room for future speed expansion.

SUMMARY OF THE INVENTION

In accordance with a first aspect of the invention, a method for operating a UART at speeds greater than 115,200 bits per second is provided. The UART has registers for controlling the flow of data in the UART. The method includes the step of providing a register in the UART, the register having a predetermined number of bits which has a constant value during the operation of the UART at speeds less than or equal to 115,200 bits per second. The method also includes the step of assigning the predetermined number of bits in the register in the UART as an Increased Baudrate Register. The method further includes the step of putting a value in the Increased Baudrate Register wherein, during the operation of the UART at speeds less than or equal to 115,200 bits per second, the value in the Increased Baudrate Register equals the constant value of the register during operation of the UART at speeds less than or equal to 115,200 bits per second, and wherein, during operation of the UART at speeds greater than 115,200 bits per second, the value in the Increased Baudrate Register does not equal the constant value of the register. And, the method includes the step of determining the bits per second of the UART based on the Increased Baudrate Register and the registers in the UART.

In accordance with a second aspect of the invention, a UART for transmitting and receiving data from a computer at speeds greater than 115,200 bits per second is provided. The UART has a clock with frequency greater than 1.8432 MHz. The UART also has a Divisor Latch Register having a Divisor Latch Most Significant Register and a Divisor Latch Least Significant Register. The UART also has an Increased Baudrate Register, the Increased Baudrate Register resident within the Divisor Latch Most Significant Register wherein bits within the Divisor Latch Most Significant Register which are zero for speeds less than 115,200 bits per second are assigned to the Increased Baudrate Register. And, the UART has a means for calculating the baudrate based on the Divisor Latch Register and the Increased Baudrate Register wherein during the operation of the UART at speeds less than or equal to 115,200 bits per second, the value in the Increased Baudrate Register equals zero, and wherein, during operation of the UART at speeds greater than 115,200 bits per second, the value in the Increased Baudrate Register does not equal zero.

It is an object of the present invention to provide a method and apparatus for supporting baudrates higher than 115,200 bps.

It is a further object of the present invention to provide a method and apparatus for maintaining full software and hardware backward compatibility.

DETAILED DESCRIPTION OF THE PRESENTLY PREFERRED EMBODIMENTS

A UART is a microprocessor-controlled serial port chip, and typically includes a programmable baud-rate generator, flexible control of bit format (number of bits, parity, etc.), synchronous modes of operation (such as HDLC and SDLC), choice of modulation methods, clock recovery and error checking. UARTs are often used to send data to and from terminals, modems, hard-copy devices (such as printers and plotters), or directly between computers, where the major requirement is universal compatibility and simplicity of interconnection. The usual method is to use serial ASCII transmitted via bipolarity RS-232 levels. A typical type of communication in which the UART operates is an 8-bit character sandwiched between a START and STOP bit, and transmitted as a 10-bit serial string at a standard baud rate.

As discussed in the background section, current UARTs are limited in terms of the speed of operation. Attempts to increase the speed should be made while still maintaining some degree of backward compatibility. In particular, new hardware (e.g., higher external clocks) should be compatible with previously designed UARTs such as the 8250, 16450 and 16550 and compatible with previously designed software. Likewise, the old hardware (e.g., previous external clocks) should be compatible with higher speed UARTs.

Figure 1:
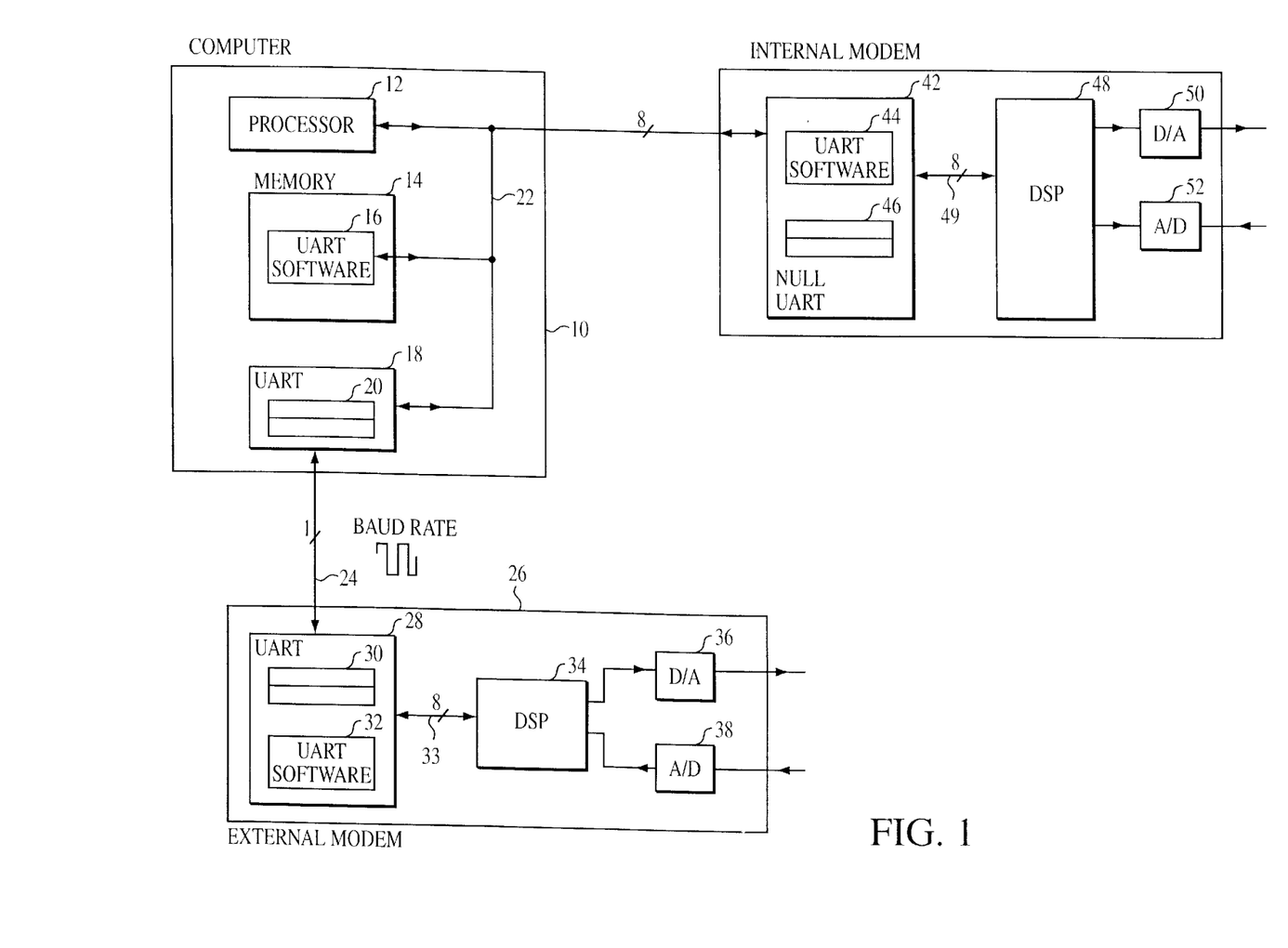
FIG. 1 is a block diagram of a computer, an external modem and an internal modem in accordance with a preferred embodiment of the present invention.

Referring to FIG. 1, there is shown a block diagram of a computer 10 (or a data communications system), an external modem 26 and an internal modem 40 in accordance with a preferred embodiment of the present invention. Any device designed to receive serial or parallel data may be connected to the UART. In particular, devices either external to the computer (as in the case of the external modem) or internal to the computer (as in the case of the internal modem) may be connected to the UART 18 for the computer. Moreover, the present invention is applicable to any device which operates like a UART, such as a USART (Universal Synchronous/Asynchronous Receiver/Transmitter).

The computer 10 is, in a preferred embodiment, a personal computer, containing a processor 12, a memory device 14, and a UART 18. The processor 12, in the preferred embodiment is an Intel Pentium® microprocessor. The memory device 14 can include a read only memory device (ROM) and a random access memory (RAM). The processor 12, memory device 14 and UART 18 are connected via a bi-directional data bus 22, which in the preferred embodiment is an 8-line bus. The memory device 14 contains UART software 16, described subsequently. The UART contains registers 20, which are also described subsequently.

The serial output of the UART 18 for the computer is connected to the UART 28 for the external modem. The UART 28 for the external modem, similar to the UART for the computer, contains registers 30, and also contains UART software 32. The UART 28 is connected, via a bus 33, to the Digital Signal Processor (DSP) 34 for the external modem. The DSP 34, which is a specialized digital microprocessor that performs calculations on digitized signals that were initially analog, is connected to a Digital-to-Analog converter (D/A) 36 and to an Analog-to-Digital converter (A/D) 38. The D/A 36 receives digital data from the DSP 34 and converts the data to analog format for transmission out of the external modem 26 to a telephone line. The A/D 38 receives analog data from the telephone line and converts the data to digital format for input to the DSP 34.

The bi-directional bus 22 of the computer is connected to the Null UART 42 of the internal modem 40. The internal modem 40 simulates the operation of the external modem 26 without using two UARTs (i.e., one UART in the computer and another UART in the external modem). The Null UART 42 is connected to the DSP 48 of the internal modem via a bus 47. Similar to the external modem 26, the internal modem 40 contains D/A and A/D converters 50, 52 so that analog data, received from the telephone line, is converted to digital data and input to the DSP 48 and digital data may be converted to analog data and output to the telephone line. Thus, from the standpoint of the input/output of the telephone line, the internal modem 40 and external modem 26 operate similarly. As an example of one implementation of the high speed UART, Appendix A includes source code to implement the high speed UART protocol in an Internal Modem application. The code is written in C language.

The UART software, either in the computer, the external modem or the internal modem, programs the registers of the UART for transmission and receipt of data. In a DOS application, the application software ordinarily controls the operation of the UART software. In a Windows application, the programming of the registers is handled by the Windows port driver. The Windows port driver then sends the message of the programming to the application software via an intermediate level between the port driver and the application software.

Figure 2:
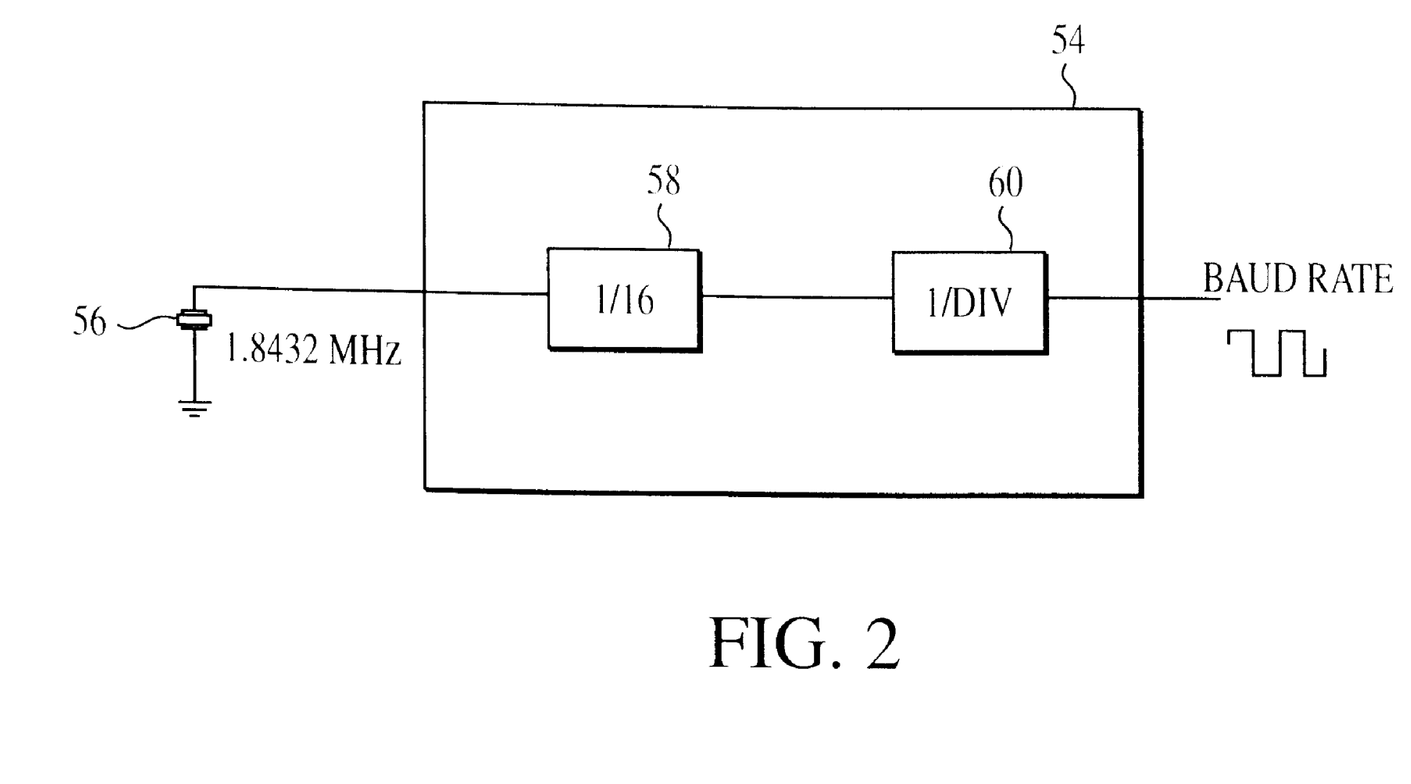
FIG. 2 is a block diagram of a prior art UART for generating the baud rate.

Referring to FIG. 2, there is shown a block diagram of a prior art UART 54 for generating the baud rate. As discussed previously, a clock is generated by using a crystal frequency in combination with a clock generator. A common external clock frequency 56 used in prior art UARTs is the 1.8432 MHz external clock (which uses a crystal frequency designed to generate a 1.8432 MHz clock cycle). The clock input is divided by 16 (58) to generate the baudrate clock. This is done so that the clock input is at a higher rate than the baud rate in order to detect the START bit and STOP bit in the serial data stream. The baudrate clock is also divided by a divisor value 60 in order to obtain the baudrate as set by the UART software. Baudrates may range from 300 baud upward. In order to obtain this range of baudrates, the divisor value (DIV) is programmed via two registers: (1) the DLL (Divisor Latch Least significant) internal register and (2) the DLM (Divisor Latch Most significant) internal register so that the 16 bits in both registers equals the divisor value. Therefore, the divisor values can range from 1 to $2^{16}-1$. In practice, however, the divisor value does not range from 1 to $2^{16}-1$ so that several bits within the DLM register are never used. For example, assuming BR is the output bit rate, DIV is the Baud Rate Divisor value, and CF is the clock frequency, then $$DIV=CF/(16*BR)$$

If the clock frequency (CF)=1.8432 MHz, the bit rate (BR)=300, then the baud rate divisor value (DIV)=384, so that only the least significant 9 bits of the Baud Rate Divisor register are needed. Therefore, 7 out of the 8 bits in the high byte of the baudrate divisor register (the DLM register) are set to zero in the conventional UART software, essentially being unused. As discussed subsequently, these unused bits are used to support bit rates higher than 115,200 bps while still maintaining full software and hardware backward compatibility. Both of these registers are shown in FIG. 1 in the UARTs for the computer, internal modem and external modem.

Other registers in the UART include the Receiver Buffer Register (RBR), which is read only; the Transmitter Holding Register (THR), which is write only; the Interrupt Enable Register (IER); Interrupt Identification Register (IIR), which is read only); the FIFO Control Register, which is write only; the Line Control Register (LCR); the Modem Control Register (MCR); the Line Status Register (LSR); the Modem Status Register (MSR); and the Scratch Register (SCR). Any of the registers with unused bits may be used for the IB register to support bit rates higher than 115,200 bps.

Figure 3A:
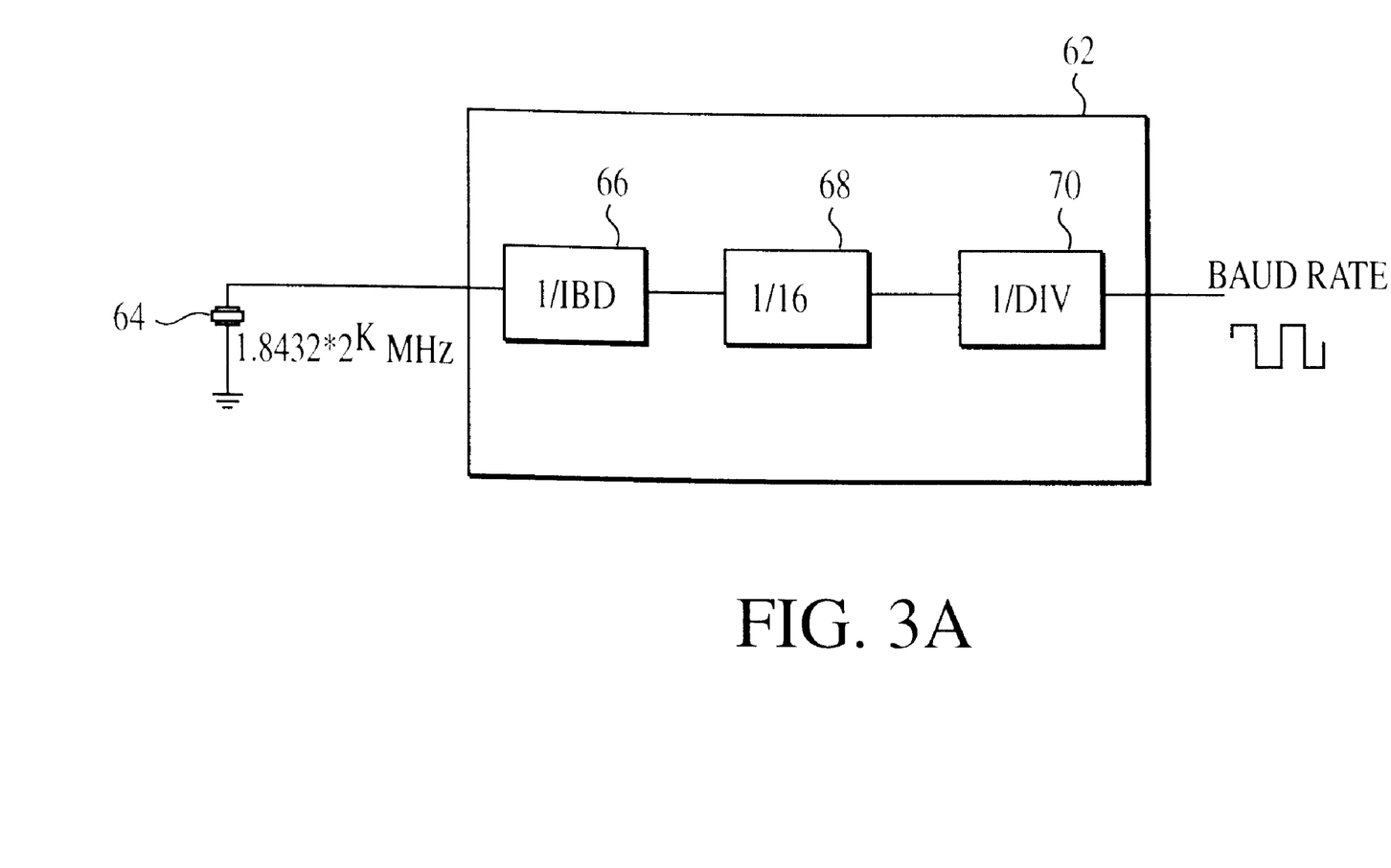
FIG. 3a is a block diagram of a UART for generating the baud rate in accordance with a preferred embodiment of the present invention.

Referring to FIG. 3*a*, there is shown a block diagram of a UART 62 for generating the baud rate in accordance with a preferred embodiment of the present invention. To increase the baudrate, a higher clock frequency is needed. However, the increased clock frequency must be integrated with the UART in order to maintain full software and hardware backward compatibility. In order to accomplish this, three bits are allocated from the DLM register to form an IB (Increased Baudrate) register. In a preferred embodiment, the remaining 5 bits in the DLM register and 8 bits in the DLL register give the divisor value from 1 to $2^{13}-1$, which from a practical standpoint, is a sufficient range for the divisor value. However, less or more bits may be assigned to the Increased Baudrate Register or the baudrate divisor value, depending on the required range of the baudrate divisor value. For instance, if the IB register must be larger, then more than 3 bits may be assigned to it. Or, if the IB register can be smaller, then 1 or 2 bits may be assigned to it.

In operation, when a data stream is sent from the computer 10 to the external modem 26, the UART software 16 programs the registers 20, including the DLL, DLM and IB registers. If the UART 18 is operating at a rate greater than 115,200 bps, the IB register is programmed accordingly, as described below, and the data stream is sent out of the port. If the speed is less than 115,200 bps, the IB register is programmed to zero (which is compatible with previously UART software programs). If the external modem 26 has an automatic baudrate detect operation, the external modem 26 senses the baudrate in the data stream and the UART software 32 in the external modem 26 programs the DLL, DLM and IB registers to reflect the baudrate of the data stream.

Similarly, when a data stream is sent from the computer 10 through the internal modem 40, the UART software 44 programs the registers 46, including the DLL, DLM and IB registers in the null UART. The null UART 42 thereafter sends the data stream according to the baudrate as determined by the registers 46.

As shown in FIG. 3*a*, the external clock input 64 as generated from the crystal will first be divided by an increased baudrate divisor (IBD) 66, which is determined by the value in IB register (the relationship between these two will be explained subsequently). Thereafter, it will be divided by 16 (68) to obtain the baudrate clock. Finally, this baudrate clock is divided by the baudrate divisor value (DIV) (70), the value in 5 bits in the DLM register and 8 bits in the DLL register, ranging from 1 to $2^{13}$, to get the desired baudrate. The ordering of the three operations is not important. Therefore, the clock may be divided in any order by the increased baudrate divisor, by 16 and by the divisor value.

As discussed previously, the prior art hardware for a conventional UART is, at its maximum, 115,200 bit-rate with a clock frequency of 1.8432 MHz. For newer UARTs, the frequency may be higher depending on the clock frequency chosen. The highest bit-rate of a XN (pronounced as "Times N") UART can deliver is the following:

$$N*115,200$$

where N=1, 2, 4, 8, 16, 32, 64, or 128. The clock frequency a XN UART uses is N*1.8432 MHz. For convenience, instead of XN, the notation $X2^k$ is used where k=0, 1, 2, 3, 4, 5, 6, and 7. In order to maintain backward compatibility, the clock frequency of a $X2^k$ UART is divided by $2^{k-IB}$ before it is used for the input frequency to the UART (where IB is the value in the Increased Baudrate Register). The term $2^{k-IB}$ is designated the Increased Baudrate Divisor (IBD). Thus, the new formula for the bit rate is the following:

$$BR=CF/(2^{k-IB}*16*DIV)$$

In order to maintain backward compatibility, the address offset of the baud rate divisor should be kept as the same as that in current UARTs, i.e., offset 0 is for the Divisor Latch Low Register, offset 1 is for the Divisor Latch High register with DLAB bit set to 1. Thus, the register addresses are maintained as the same (the addition of the IB register does not make the current application incompatible since it is contained within the Divisor Latch High register). In this way, the current UART application software can still set the value for the divisor, being fully compatible with conventional UART software.

Figure 4:
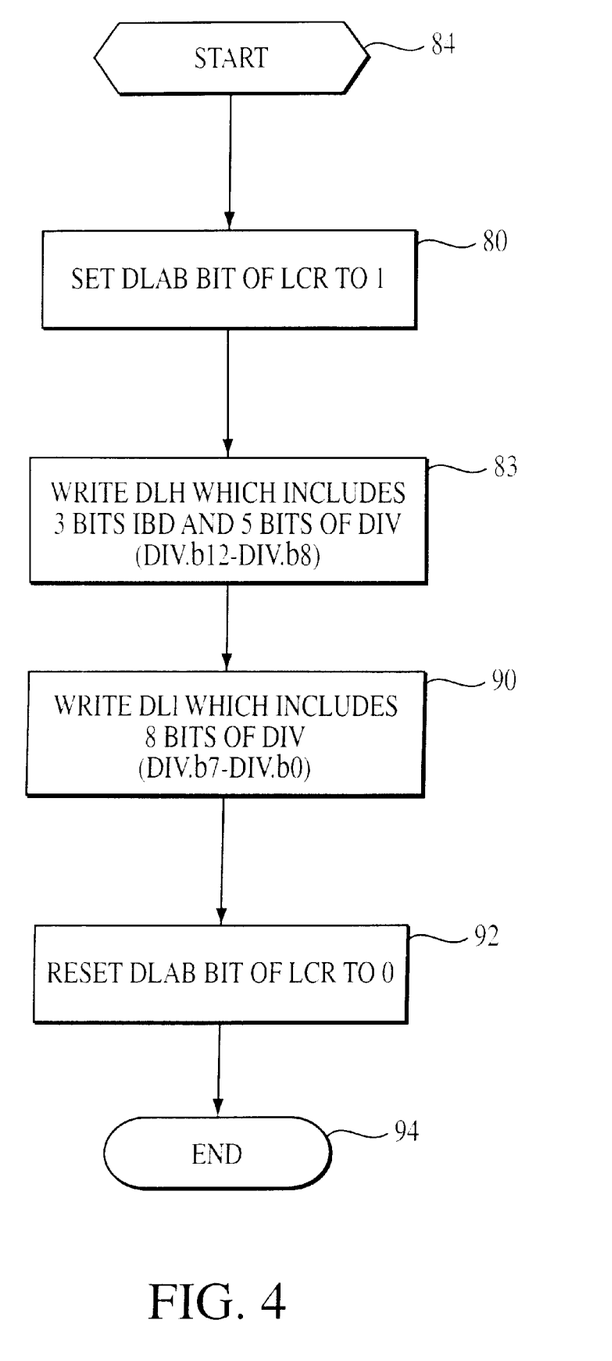
FIG. 4 is a flow chart of the programming for the IB and DIV registers.

As shown in FIG. 4, there is a flow chart of the programming for the IB and DIV registers. First, the DLAB bit of the Line Control Register (LCR) is set to 1 (86). Conventional UART software sets this bit in order to signify that the DIV registers are being programmed. Thereafter, the DLM register (which includes the IB register) and the DLL register is programmed. In particular, the high byte of the divisor latch register is written, which includes 3 bits for the IB register and 5 bits for the divisor register (bits 8 through 12) (88). The low byte of the divisor latch register is then written 90. The DLAB bit of the Line Control Register (LCR) is then reset to 0 (92), as was done in conventional UART software.

The valid values for the IB register, as programmed by the UART software, for a $X2^k$ UART is IB register≦k (the power-up default value for IB register is zero). For example, for a X8 UART, k=3 and valid IB register values in binary can be 000, 001, 010, and 011. The clock frequency 1.8432*8 MHz will be pre-divided as the following:

| IB register | IBD ($2^{3-IB}$) | Actual Input Freq. to UART |
|---|---|---|
| 000 | 8 | 1.8432 MHz |
| 001 | 4 | 2* 1.8432 MHz |
| 010 | 2 | 4* 1.8432 MHz |
| 011 | 1 | 8* 1.8432 MHz |

In the case when the Increased Baudrate Divisor ($2^{3-IB}$) and Baud Rate Divisor can be chosen in different combinations to obtain the same bit rate, the smallest IB register value should be selected. In this way, the DLM register will be the same as in the current UARTs when the desired baudrate is less than or equal to 115,200 bps. Therefore, there is no additional programming necessary to maintain backward compatibility.

In addition, assuming a $X2^k$UART is used, then the Baud Rate Divisor value (DIV) is calculated by:

$$DIV=2^k*1.8432*10^6/(16*2^{k-IB}*BR)$$

$$=2^{IB}*115,200/BR$$

For all the bit rates $BR \leq 115,200$, we select IB=0, so that this DIV value is the same as if a current UART is used, in order to maintain backward compatibility. When the bit rate $BR=2^n*115,200$ with $0<n \leq k$, we select value of the IB register=n. Therefore, DIV is equal to 1.

Since there is no additional input or output addresses needed in this approach, the hardware configuration is downwardly compatible. As stated previously, the three most significant bits in DLM are always programmed to 0 by the current software. In the present approach, when $IB=000_2$ (the three most significant bits of the DLM), the device will operate as a normal UART supporting baudrates up to 115,200 bps. Therefore, the current Serial Communication application software or Windows Driver will still work at baudrates up to 115,200 bps. If the baudrate above 115,200 bps is used on a XN UART, the only requirement of the UART software is to program the appropriate IBD and DIV value based on this proposal.

In addition, the current implementation allows sufficient room for future speed expansion of the UART. The highest baudrate by using X128 UART is the following:

$$BR=CF/(2^{k-IB}*16*DIV)=1.8432*128/(2^{7-7}*16*1)=14.7456 \text{ Mbps}$$

where $IB=111_2$ and $DIV=0000000000001_2$.

Figure 3B:
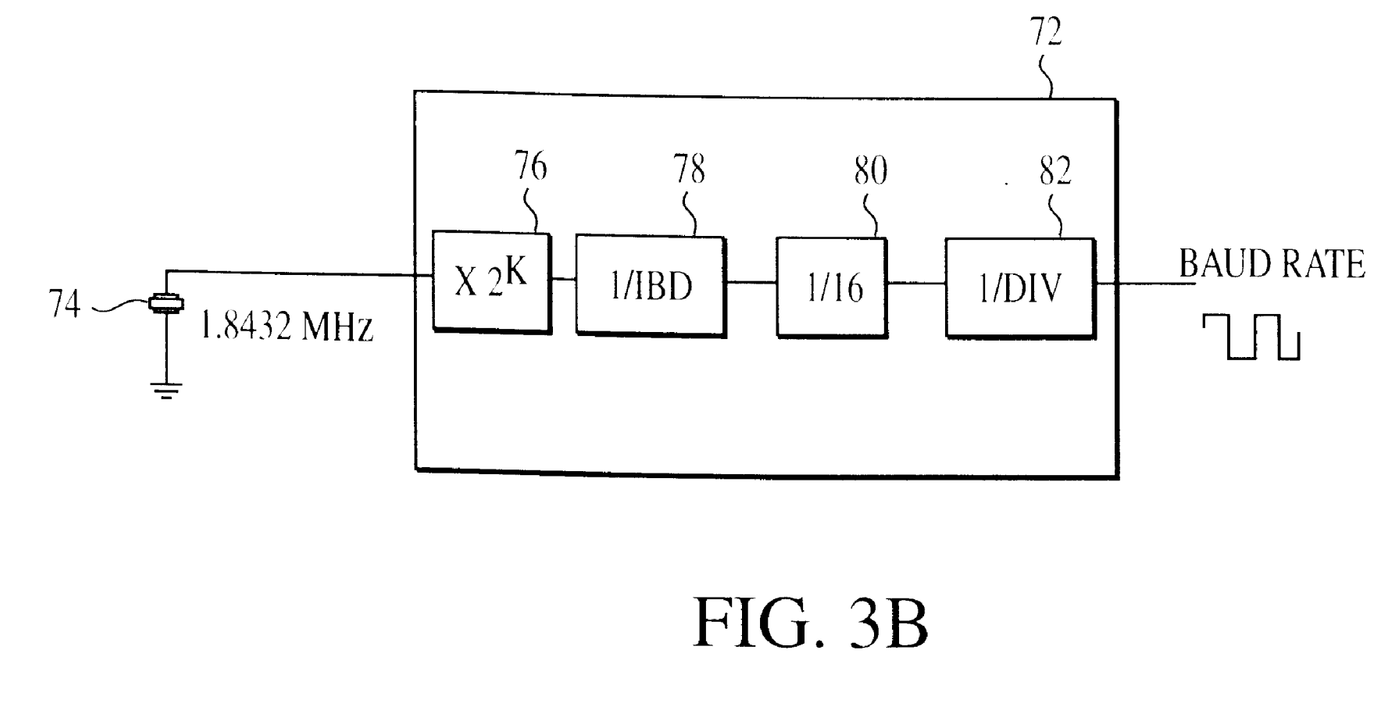
FIG. 3b is a block diagram of a UART for generating the baud rate in accordance with another embodiment of the present invention.

In an alternate embodiment of the invention, the speed of the UART may be increased, not by increasing the external clock used for the timing of the UART, but through other means. Referring to FIG. 3b, there is shown a block diagram of a UART 72 for generating the baud rate in accordance with another embodiment of the present invention. As shown in FIG. 3b, the standard 1.8432 MHz crystal is used in combination with a clock generator to generate the 1.8432 MHz clock 74, as in a conventional UART, is used. In contrast to a conventional UART implementation, there is a frequency multiplication function incorporated into the UART chip (such function can be implemented by a frequency doubler circuitry). As shown in FIG. 3b, the input clock frequency is multiplied by $2^k$ (76). Therefore, the speed for the UART as shown in FIG. 3b is similar to the clock frequency a $X2^k$ UART, which uses $X2^{k}*$ 1.8432 MHz. Thus, when upgrading a conventional UART with a 1.8432 MHz crystal, rather than requiring the replacement of the 1.8432 MHz crystal with a $X2^k*1.8432$ MHz crystal, only the UART need be replaced, simplifying the upgrade. Thereafter, the frequency is divided by an increased baudrate divisor (IBD) 78, which is determined by the value in IB register (the relationship between these two was explained previously). Thereafter, it is divided by 16 (80) to obtain the baudrate clock. Finally, this baudrate clock is divided by the baudrate divisor value (DIV) (82).

It is intended that the foregoing detailed description be regarded as illustrative rather than limiting and that it is understood that the following claims, including all equivalents, are intended to define the scope of the invention.

APPENDIX A

```
/****************************************************************
The following is the code to implement the high speed UART protocol in
an Internal Modetm application. First, set DLAB in LCR is set to 1 in
order to read the DLH and DLL. Second, read DLH and DLL, concatenate
the two bytes into one word, and store it in variable baud_divisor. Next,
set DLAB back to 0. Get DIV and IBD value based on baud_divisor:
IBD
is the 3 most significant bits of baud_divisor; DIV is the rest of the bits
of baud_divisor. Finally, calculate the character period (time for UART
to send and receive one character) based on equation:
      char_period = ONE_SECOND / 11520 * DIV / 2^IB.
****************************************************************/ include <stdio.h> void read_baud(int char_period, int ib_register, int div_register)
{
    int       baud_divisor;

unsigned char temp_byte;
    int lcr_port = LCR;      /* UART Line Control Register */
    int dlh_port = DLH;      /* UART baud rate Divisor Latch High */
    int dll_port = DLL;      /* UART baud rate Divisor Latch Low */

/* set DLAB to 1 in order to access DLH and DLL */ temp_byte = inportb(icr_port);
    temp_byte |= 80H;        /* Set DLAB to 1 */
    outportb(lcr_port,temp_byte);

/* read DLH and DLL, and concatenate 2 bytes into one word */ baud_divisor = INT(inportb(dlh_port)) << 8 ;
    baud_divisor = INT(inportb(dll_port)) << 8 ;

/* set DLAB back to 0 */ temp_byte &= 7FH;        /* Set DLAB to 0 */
    outportb(lcr_port,temp_byte);

/* get the DIV and IB from baud_divisor: 1. IB is the 3 most significant
bits of DLH; 2. DIV is the 5 least significant bits of DLH and 8 bits of
DLL */ div_register = baud_divisor & 1FFFH
    ib_register = baud_divisor >> 13 ;

/* char_period is the time for UART to send or receive one character,
and is equal to (ONE_SECOND / 11520 * DIV / 2^IB)  */ char_period = ONE_SECOND / 11520 * div_register /( 1 <<
    ib_register);

}
```

We claim:

1. In a Universal Asynchronous Receiver/Transmitter ("UART") that includes registers for controlling the flow of data in the UART, a method for operating a UART at speeds greater than 115,200 bits per second comprises the steps of:
   providing a register in the UART, the register having a predetermined number of bits which has a constant value during the operation of the UART at speeds less than or equal to 115,200 bits per second;

assigning the predetermined number of bits in the register in the UART as an Increased Baudrate Register;

putting a value in the Increased Baudrate Register wherein, during the operation of the UART at speeds less than or equal to 115,200 bits per second, the value in the Increased Baudrate Register equals the constant value of the register during operation of the UART at speeds less than or equal to 115,200 bits per second, and wherein, during operation of the UART at speeds greater than 115,200 bits per second, the value in the Increased Baudrate Register does not equal the constant value of the register; and determining the bits per second of the UART, in part, based on the Increased Baudrate Register.

2. A method for operating a UART as claimed in claim 1 wherein the constant value during the operation of the UART at speeds less than or equal to 115,200 bits per second is equal to zero and wherein the value in the Increased Baudrate Register equals zero during operation of the UART at speeds less than or equal to 115,200 bits per second.

3. A method for operating a UART as claimed in claim 1 wherein the register having a predetermined number of bits is the Divisor Latch Register.

4. A method for operating a UART as claimed in claim 3 wherein the predetermined number of bits are the three highest bits in the Divisor Latch Register.

5. A method for operating a UART as claimed in claim 3 wherein the step of determining the bits per second of the UART is based on the values in the Divisor Latch Register and the Increased Baudrate Register.

6. A method for operating a UART as claimed in claim 1 further comprising the step of providing a clock frequency greater than 1.8432 MHz.

7. In a Universal Asynchronous Receiver/Transmitter ("UART") that includes registers for controlling the flow of data in the UART, a method for operating a UART with a clock frequency greater than 1.8432 MHz comprising the steps of:

providing a clock with frequency greater than 1.8432 MHz;

assigning a predetermined number of bits in a register in the UART as an Increased Baudrate Register, the predetermined number of bits being a constant value during the operation of the UART at frequencies input to the UART which are less than or equal to 1.8432 MHz;

putting a value in the Increased Baudrate Register wherein, during the operation of the UART at frequencies input to the UART which are less than or equal to 1.8432 MHz, the value in the Increased Baudrate Register equals the constant value of the register during operation of the UART at frequencies input to the UART which are less than or equal to 1.8432 MHz, and wherein, during operation of the UART at frequencies input to the UART which are more than 1.8432 MHz, the value in the Increased Baudrate Register does not equal the constant value of the register; and determining the baud rate of the UART, in part, based on the Increased Baudrate Register.

8. A method for operating a UART as claimed in claim 7 wherein the step of providing a clock frequency greater than 1.8432 MHz includes using a clock frequency of 1.8432 MHz and using a frequency doubler.

9. A method for operating a UART as claimed in claim 7 wherein the step of providing a clock frequency greater than 1.8432 MHz includes using a clock frequency which is a multiple of 1.8432 MHz such that the clock frequency is $2^{k}*1.8432$ MHz where k is an integer.

10. A method for operating a UART as claimed in claim 9 wherein the value put in the Increase Baudrate Register is equal to IB and wherein the step of determining the baud rate of the UART includes dividing the clock frequency by $2^{k-IB}$.

11. A method for operating a UART as claimed in claim 7 wherein the step of determining the baud rate of the UART includes dividing the clock frequency based on the value in the Increased Baudrate Register.

12. In a Universal Asynchronous Receiver/Transmitter ("UART") that includes a frequency and registers for controlling the flow of data in the UART, one register is the Divisor Latch Most Significant Register and another register is the Divisor Latch Least Significant Register, a method for operating a UART at speeds greater than 115,200 bits per second comprises the steps of:

assigning a predetermined number of bits in the Divisor Latch Most Significant Register in the UART as an Increased Baudrate Register, the predetermined number of bits having a value of zero during the operation of the UART at speeds less than or equal to 115,200 bits per second;

putting a value in the Increased Baudrate Register wherein, during the operation of the UART at speeds less than or equal to 115,200 bits per second, the value in the Increased Baudrate Register equals zero, and wherein, during operation of the UART at speeds greater than 115,200 bits per second, the value in the Increased Baudrate Register does not equal zero; and determining the bits per second of the UART based on the Increased Baudrate Register, the Divisor Latch Most Significant Register and the Divisor Latch Least Significant Register.

13. A method for operating a UART as claimed in claim 12 wherein the step of determining the bits per second of the UART includes dividing the clock frequency by the value in the Divisor Latch Most Significant Register and the Divisor Latch Least Significant Register, and by a value based on the value in the Increased Baudrate Register.

14. A method for operating a UART as claimed in claim 13 wherein the step of determining the bits per second of the UART further includes dividing the clock frequency by 16.

15. A method for operating a UART as claimed in claim 13 wherein the number of bits in the Increased Baudrate Register is 3.

16. A Universal Asynchronous Receiver/Transmitter ("UART") for transmitting and receiving data from a computer at speeds greater than 115,200 bits per second, the UART comprising:

a clock with frequency greater than 1.8432 MHz;

a Divisor Latch Register having a Divisor Latch Most Significant Register and a Divisor Latch Least Significant Register;

an Increased Baudrate Register, the Increased Baudrate Register resident within the Divisor Latch Most Significant Register wherein bits within the Divisor Latch Most Significant Register which are zero for speeds less than 115,200 bits per second are assigned to the Increased Baudrate Register; and means for calculating the baudrate based on the Divisor Latch Register and the Increased Baudrate Register wherein during the operation of the UART at speeds less than or equal to 115,200 bits per second, the value in the Increased Baudrate Register equals zero, and wherein, during operation of the UART at speeds greater than 115,200 bits per second, the value in the Increased Baudrate Register does not equal zero.

17. A UART as claimed in claim 16 wherein the means for calculating the baudrate includes means for dividing the clock frequency based on the value in the Increased Baudrate Register.

18. A UART as claimed in claim 16 wherein the clock frequency is a multiple of 1.8432 MHz such that the clock frequency is $2^k*1.8432$ MHz where k is an integer.

19. A UART as claimed in claim 18 wherein the value put in the Increase Baudrate Register is equal to IB and wherein the means for calculating the baudrate includes means for dividing the clock frequency by $2^{k-IB}$.

20. A data communications system comprising:

a processor;

a memory device;

a universal asynchronous receiver/transmitter (UART) for transmitting and receiving data and operating with a clock frequency greater than 1.8432 MHz;

a bus connecting the processor, memory device and UART wherein the UART comprises:

a clock with frequency greater than 1.8432 MHz;

a Divisor Latch Register having a Divisor Latch Most Significant Register and a Divisor Latch Least Significant Register;

an Increased Baudrate Register, the increased Baudrate Register resident within the Divisor Latch Most Significant Register wherein bits within the Divisor Latch Most Significant Register which are zero for speeds less than 115,200 bits per second are assigned to the Increased Baudrate Register; and means for calculating the baudrate based on the Divisor Latch Register and the Increased Baudrate Register wherein during the operation of the UART at speeds less than or equal to 115,200 bits per second, the value in the Increased Baudrate Register equals zero, and wherein, during operation of the UART at speeds greater than 115,200 bits per second, the value in the Increased Baudrate Register does not equal zero.

21. A data communications system as claimed in claim 20 further comprising a modem, the modem having a modem UART, the modem UART serially connected to the UART, the modem UART comprising:

a clock with frequency greater than 1.8432 MHz;

a Divisor Latch Register having a Divisor Latch Most Significant Register and a Divisor Latch Least Significant Register;

an Increased Baudrate Divisor Register, the increased Baudrate Divisor Register resident within the Divisor Latch Most Significant Register wherein bits within the Divisor Latch Most Significant Register which are zero for speeds less than 115,200 bits per second are assigned to the Increased Baudrate Register; and means for calculating the baudrate based on the Divisor Latch Register and the Increased Baudrate Register wherein during the operation of the modem UART at speeds less than or equal to 115,200 bits per second, the value in the Increased Baudrate Register equals zero, and wherein, during operation of the modem UART at speeds greater than 115,200 bits per second, the value in the Increased Baudrate Register does not equal zero.

* * * * *

UNITED STATES PATENT AND TRADEMARK OFFICE
CERTIFICATE OF CORRECTION

PATENT NO. : 6,055,585
DATED : April 25, 2000
INVENTOR(S) : Xing W. Wu, Ming D. Tan, Amer Naseem It is certified that error appears in the above-identified patent and that said Letters Patent is hereby corrected as shown below:

<u>Title page,</u>
Inventors, line 2, after "Gurnee," add -- Amer Naseem, Palatine, -- and change "both" to -- all --

Signed and Sealed this

Second Day of April, 2002

Attest:

JAMES E. ROGAN
*Attesting Officer*     *Director of the United States Patent and Trademark Office*